United States Patent [19]

Butler

[11] Patent Number: 5,656,353

[45] Date of Patent: Aug. 12, 1997

[54] LAMINATED HEAT SHIELD WITH PRONGS AND METHOD OF MANUFACTURING SAME

[75] Inventor: Richard Martin Butler, Canton, Mich.

[73] Assignee: TBA Composites, Inc., Chesterfield Township, Mich.

[21] Appl. No.: 495,158

[22] Filed: Jun. 27, 1995

[51] Int. Cl.$^6$ ............................................. B32B 3/06
[52] U.S. Cl. ................... 428/133; 428/457; 428/99; 428/137; 428/131; 428/213; 428/215; 428/156; 428/920; 29/432; 29/515; 29/521; 156/251; 156/261; 264/273; 264/274
[58] Field of Search ......................... 428/457, 133, 428/99, 137, 131, 213, 215, 156, 920; 29/432, 515, 521; 156/251, 261; 264/273, 274

[56] References Cited

U.S. PATENT DOCUMENTS

| | | | |
|---|---|---|---|
| 1,915,611 | 6/1933 | Miller | 52/794.1 |
| 1,927,450 | 9/1933 | Balfe | 428/133 |
| 1,948,252 | 2/1934 | Bailey | 428/133 |
| 2,247,558 | 7/1941 | Nichols | 156/303.1 |
| 3,443,349 | 5/1969 | Mahle | 428/133 |
| 4,064,299 | 12/1977 | Martin | 428/102 |
| 4,451,514 | 5/1984 | Hunt | 428/71 |
| 4,911,972 | 3/1990 | Mercuri | 428/99 |
| 5,080,949 | 1/1992 | Nawrocki et al. | 428/75 |
| 5,114,818 | 5/1992 | Yu | 430/97 |
| 5,172,920 | 12/1992 | Schlenk | 277/227 |
| 5,174,714 | 12/1992 | Plemmons et al. | 415/177 |
| 5,188,981 | 2/1993 | Stiles et al. | 428/195 |
| 5,211,013 | 5/1993 | Bonde et al. | 60/323 |
| 5,226,788 | 7/1993 | Fledderjohn | 415/177 |
| 5,233,953 | 8/1993 | Whitehurst et al. | 123/198 E |

FOREIGN PATENT DOCUMENTS 544878  4/1942  United Kingdom ................. 428/133

*Primary Examiner*—William Watkins
*Attorney, Agent, or Firm*—Harness, Dickey & Pierce P.L.C.

[57] ABSTRACT

An automotive vehicle heat shield is formed from a laminated sheet material having a thin reflective metallic layer laminated to a structural plastic layer. Mounting brackets are riveted to the laminated sheet material to mount the heat shield between a heat sensitive vehicle component and a heat source. The reflective metallic layer is perforated forming a plurality of prongs which are embedded into the plastic layer through a compression molding process to bond the two layers together forming the laminated sheet material.

5 Claims, 2 Drawing Sheets

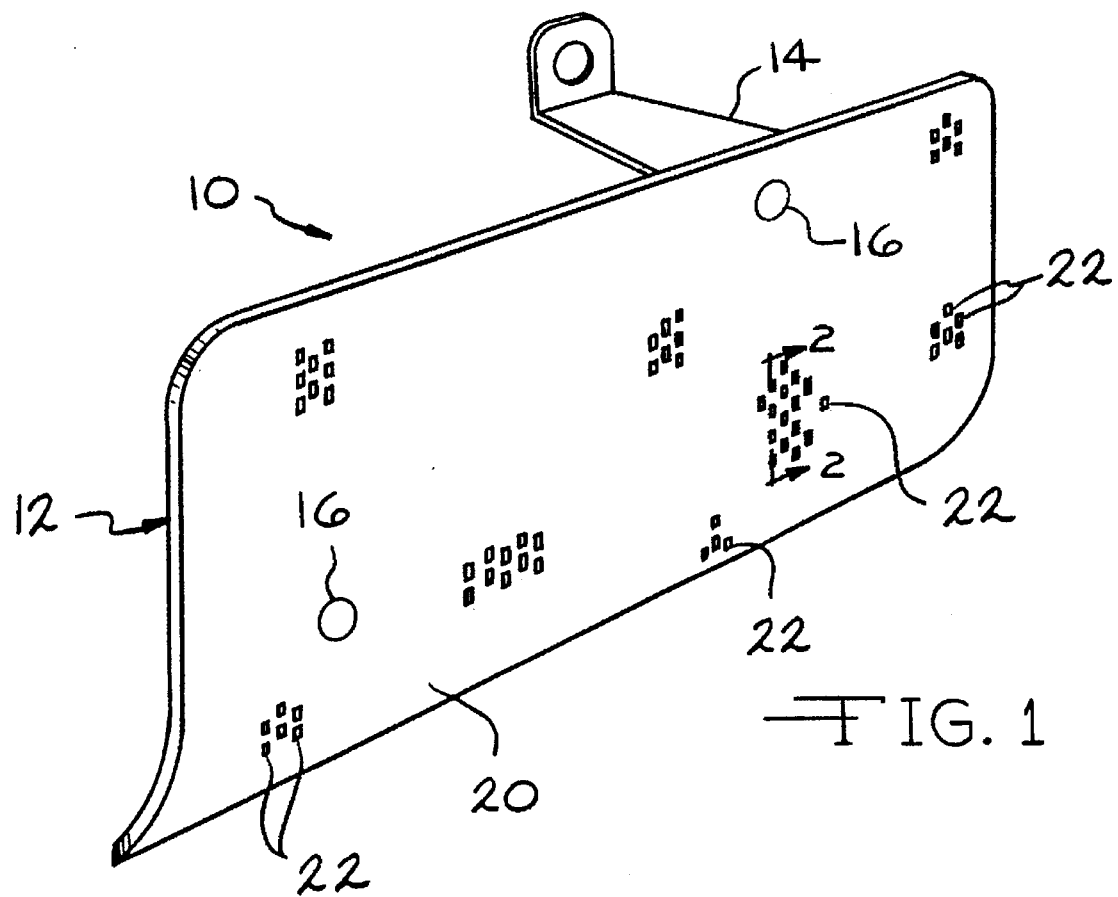
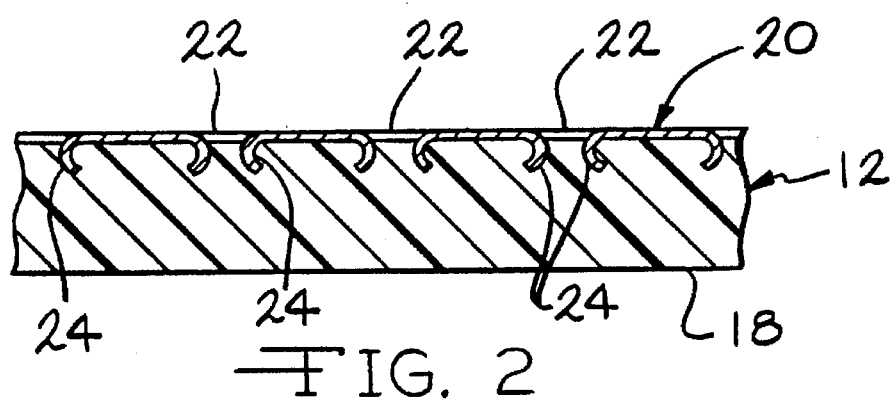

LAMINATED HEAT SHIELD WITH PRONGS AND METHOD OF MANUFACTURING SAME

BACKGROUND OF THE INVENTION

The present invention relates to a heat shield, and in particular to a heat shield made from a laminated sheet material and intended for use in a vehicle with an internal combustion engine, such as an automobile or truck.

Modern internal combustion engines are typically designed to have high working temperatures to provide high thermodynamic efficiency. The high thermodynamic efficiency reduces fuel consumption, but the high working temperatures of the engine are a source of great practical difficulty in the construction and operation of the vehicle. The maximum temperature of combustion of gasoline in a cylinder approaches the melting point of platinum, and even the exhaust gas from the engine may have a temperature above the melting point of aluminum. Careful heat management is necessary to ensure that the components of an automobile can endure long years of reliable use in a high temperature environment.

Heat shields are used increasingly in modem automobiles as a technique for managing heat. Since the heat managing problems typically vary from one automobile model to the next, depending upon many factors such as engine home power and design, the layout of components under the hood, susceptibility of various components to deterioration due to high temperature, under hood air flow, and so forth, the exact configuration of the heat shields for automotive performance will vary from model to model.

An automotive heat shield typically has one surface to reflect radiant heat. In addition, the heat shield must also have sufficient structure to retain its shape over the life of the vehicle, have a minimum number of fasteners to attach the heat shield to the vehicle and must be light in weight.

It is an object of the present invention to provide a low cost and easy to manufacture heat shield.

It is a further object of the invention to provide a heat shield having the needed structural characteristics to retain its shape over the life of the vehicle and also has a minimum number of fasteners to attach the heat shield to a vehicle.

SUMMARY OF THE INVENTION

The heat shield of the present invention is made of a laminated sheet material having a relatively thin metallic reflective layer attached to an insulating layer. The insulating layer is made of an engineered structural plastic. The metallic layer is perforated with a plurality of small, generally rectangular shaped perforations that form prongs extending from the metallic layer in a common direction. The prongs are embedded into the plastic insulating layer to provide a rigid, mechanically bonded laminate with a reflective surface. The metallic layer and the plastic insulation layer are compression molded together to embed the prongs of the metallic layer into the plastic insulating layer.

Mounting brackets are attached to the laminated sheet material, typically on the side of the insulating plastic layer. The mounting brackets enable attachment of the heat shield to a motor vehicle between a heat sensitive component and a heat source. The reflective surface faces the heat source to reflect radiant heat.

The engineered structural plastic layer provides the necessary structure to the heat shield. The plastic material can be heated and then molded to a desired shape, while combining the plastic and perforated metallic material together to form a laminated heat shield.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a heat shield according to the present invention;

FIG. 2 is a sectional view of the heat shield laminated material as seen from substantially the line 2—2 of FIG. 1.

DETAILED DESCRIPTION OF THE PREFERRED EMBODIMENT

Figure 3:
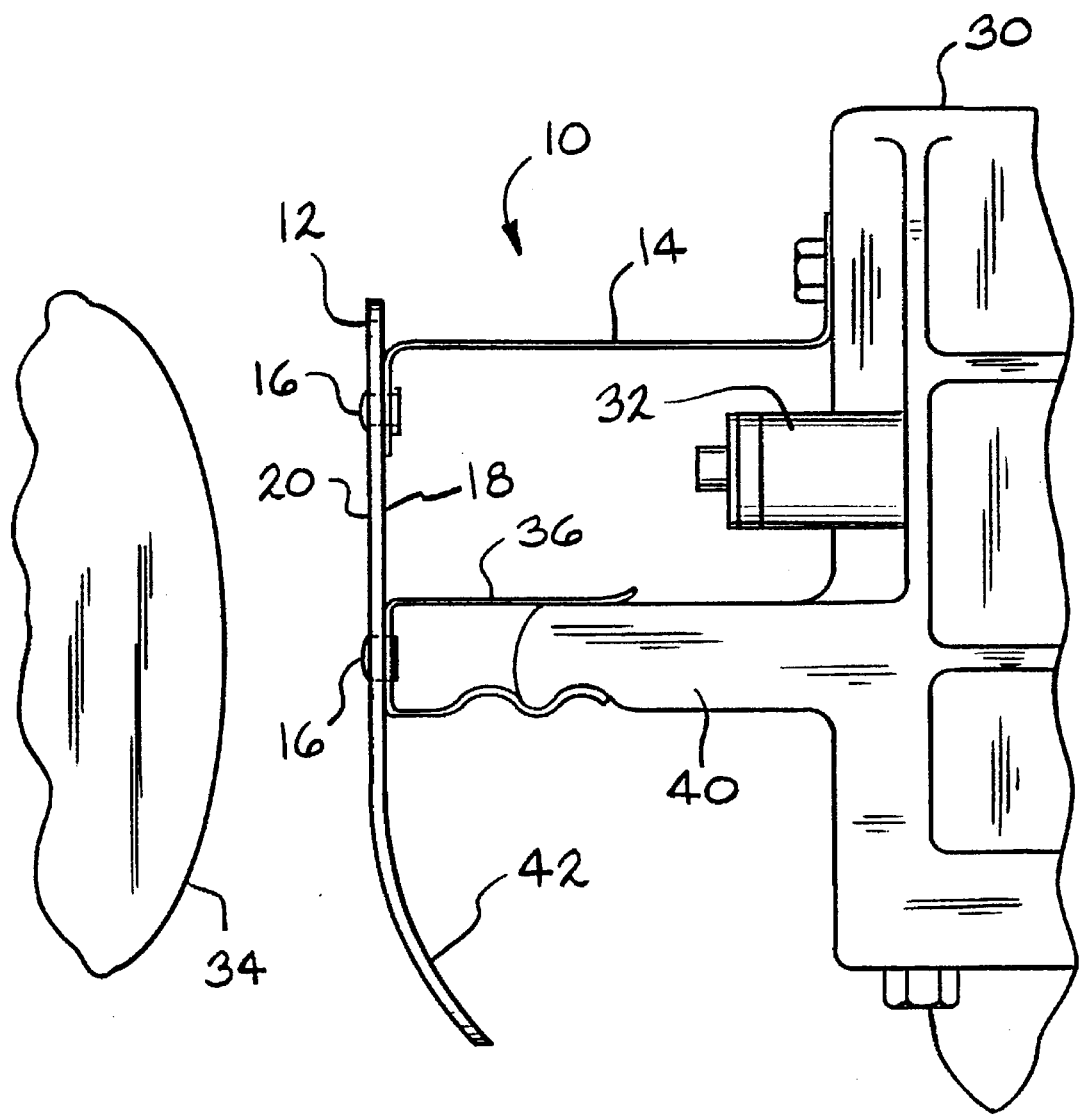
FIG. 3 is an elevational view illustrating the heat shield installed within a vehicle and placed between a heat source and a heat sensitive component.

A heat shield made according to the present invention is shown in FIG. 1 and designated generally at 10. The heat shield 10 includes a three-dimensional body 12 formed of a laminated sheet material and a plurality of mounting brackets attached to the laminate by rivets 16. Only one bracket 14 is shown in FIG. 1. The laminated sheet material is shown in greater detail in FIG. 2 and comprises two layers. A first layer 18 is made of an engineered structural thermoplastic material. A suitable polyester resin is sold under the trade name "AZMET" and is available from AZDEL, Inc.

The other layer in the laminated material 12 is a reflective metallic layer 20. The layer 20 has a plurality of small perforations 22 which are formed by a piercing operation. The piercing operation results in a plurality of prongs 24 that are formed at opposite ends of the rectangular perforations. The prongs 24 extend from the metallic layer 20 in the same direction. The laminated material 12 is then formed by compression molding the plastic layer 18 to the metallic layer 20, causing the prongs 24 to be embedded into the plastic layer.

Various metallic materials can be used in the heat shield such as aluminum, stainless steel or coated low carbon steel. A primary consideration in selecting the material is the durability of the material in a hot and corrosive environment beneath a vehicle body. Preferably, the metallic layer will comprise about 20% of the total laminate thickness. In one embodiment, the metal layer is 0.3 mm in thickness, while the plastic layer is 2.0 mm in thickness. The perforations in the metal layer can be of many different shapes. Small rectangular perforations have been found to be easily formed to produce a prong at each end. The piercing operation used to form the perforations will produce prongs. The prongs enable the joining of the two layers with the compression molding operation.

With reference to FIG. 3, the heat shield 10 is shown installed in a motor vehicle. The mounting bracket 14 is bolted, in this case, to a transmission housing 30. The transmission includes a solenoid 32 which is sensitive to heat. The solenoid is located near a heat source such as a catalytic converter 34 and needs protection from the extreme heat of the catalytic converter. A second mounting bracket 36 is also attached to the laminated material 12 by a rivet 38 and is coupled to a projection 40 of the transmission housing.

The laminated material 12 is positioned so that the reflective metallic layer 20 faces toward the catalytic converter 34 with the plastic insulating layer 18 facing toward the transmission housing. The metallic layer 20 provides reflection of heat generated by the catalytic converter away from the heat sensitive solenoid 32. The plastic insulating layer 18 provides structural support to the reflective metallic layer. The reflective metallic layer, in addition to reflecting heat, also provides the prongs 24 that are embedded into the plastic layer, joining the two layers together to form the laminated sheet material. The laminated material is subsequently molded to form the necessary shape such as that shown by the bend 42 at the lower end of the heat shield resulting in a three-dimensional body. Additional bends can be provided as needed to fit the heat shield between vehicle components.

It is to be understood that the invention is not limited to the exact construction illustrated and described above, but that various changes and modifications may be made without departing from the spirit and scope of the invention as defined in the following claims.

I claim:

1. A heat shield for use in protecting a heat sensitive vehicle component from heat generated by a nearby heat source comprising:

a three dimensional body formed of a sheet material comprised of an insulating layer of a plastic material and a metallic layer having a plurality of perforations therein forming a plurality of prongs extending from said metallic layer in one direction, said prongs being embedded into said insulating layer to join said insulating layer to said metallic layer and at least one bend in said sheet material to shape said sheet material into said three dimensional body; and mounting means attached to said three dimensional body and extending from said insulating layer to mount said three dimensional body between the heat sensitive vehicle component and the nearby heat source with said metallic layer facing the heat source.

2. The heat shield of claim 1 wherein said metallic layer is made of aluminum, stainless steel or low carbon steel.

3. The heat shield of claim 1 wherein said insulating layer is made of a thermoplastic material.

4. The heat shield of claim 1 wherein said metallic layer is approximately 0.3 mm in thickness and said insulating layer is approximately 2.0 mm in thickness.

5. A method of manufacturing a heat shield for use in protecting a heat sensitive vehicle component from heat generated by a nearby heat source, the method comprising the steps of:

providing a metallic sheet;

piercing the metallic sheet to form perforations therein with the perforations producing a plurality of prongs extending from the metallic sheet in one direction;

providing a sheet of plastic material;

compression molding the metallic sheet to the plastic sheet causing the prongs of the metallic sheet to be embedded into the plastic sheet to join the metallic and plastic sheets together to form a laminated material having metallic and plastic layers;

molding the laminated material into a desired three dimensional shape to form a three dimensional body; and attaching at least one mounting bracket to the three dimensional body such that the mounting bracket extends from the plastic layer of the three dimensional body for mounting the heat shield to a vehicle between a heat sensitive component and a heat source with the metallic layer facing the heat source.

* * * * *